(12) United States Patent
Sahara (10) Patent No.: US 8,913,681 B2
(45) Date of Patent: Dec. 16, 2014

(54) RADIO BASE STATION AND COMMUNICATION CONTROL METHOD

(75) Inventor: Toru Sahara, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 13/810,392

(22) PCT Filed: Jul. 15, 2011

(86) PCT No.: PCT/JP2011/066274
§ 371 (c)(1),
(2), (4) Date: Jan. 15, 2013

(87) PCT Pub. No.: WO2012/008592
PCT Pub. Date: Jan. 19, 2012

(65) Prior Publication Data
US 2013/0114753 A1    May 9, 2013

(30) Foreign Application Priority Data

Jul. 16, 2010  (JP) ................. 2010-162330

(51) Int. Cl.
*H04B 7/02* (2006.01)
*H04B 7/08* (2006.01)
*H04W 24/10* (2009.01)
*H04L 5/00* (2006.01)

(52) U.S. Cl.
CPC .............. *H04B 7/0865* (2013.01); *H04B 7/086* (2013.01); *H04W 24/10* (2013.01); *H04L 5/0023* (2013.01); *H04L 5/0048* (2013.01)
USPC ........... 375/267; 375/260; 375/262; 375/295; 375/316; 375/345

(58) Field of Classification Search
CPC ........... H04L 2025/03414; H04L 2025/03426; H04L 2025/03796; H04L 2025/03815; H04L 25/0226; H04L 25/03343; H04L 5/0007; H04L 5/0048; H04L 5/0094; H04L 27/2613; H04L 27/2647; H04W 72/04; H01Q 1/244
USPC ........ 375/260, 262, 265, 267, 270, 278, 295, 375/299, 316, 322, 328, 332, 340, 342, 350
See application file for complete search history.

(56) References Cited

U.S. PATENT DOCUMENTS 7,389,193 B2 * 6/2008 Kim et al. ...................... 702/106
7,653,140 B2 * 1/2010 Pajukoski et al. ............. 375/260

(Continued)

FOREIGN PATENT DOCUMENTS

JP   2003-152676 A   5/2003
JP   2006-013786 A   1/2006

(Continued)

OTHER PUBLICATIONS

3GPP TS 36.211 V8.7.0 (May 2009); 3rd Generation Partnership Project; Technical Specification Group Radio Access Network; Evolved Universal Terrestrial Radio Access (E-UTRA); Physicals Channels and Modulation (Release 8).

(Continued)

*Primary Examiner* — Hirdepal Singh
(74) *Attorney, Agent, or Firm* — Studebaker & Brackett PC (57) ABSTRACT

A radio base station (eNB 1) receives an SRS from the radio terminal (UE 2A) and SRSes from radio terminals (UE 2B through UE 2D), and calculates, on the basis of at least one of the SRSes from the radio terminal (UE 2A) and from the radio terminals (UE 2B through UE 2D), a reception weight that is to be used for wireless communication with the radio terminal (UE 2A).

4 Claims, 5 Drawing Sheets

(56) References Cited

U.S. PATENT DOCUMENTS

| | | | |
|---|---|---|---|
| 8,289,863 B2* | 10/2012 | Vook et al. | 370/252 |
| 8,331,863 B2* | 12/2012 | Kleider et al. | 455/59 |
| 2003/0090419 A1* | 5/2003 | Tanaka et al. | 342/378 |
| 2007/0248196 A1 | 10/2007 | Nakao et al. | |
| 2010/0157909 A1* | 6/2010 | Miura et al. | 370/329 |
| 2011/0098054 A1* | 4/2011 | Gorokhov et al. | 455/452.1 |
| 2012/0076039 A1* | 3/2012 | Kwon et al. | 370/252 |

FOREIGN PATENT DOCUMENTS

| | | |
|---|---|---|
| JP | 2007-201951 A | 8/2007 |
| JP | 2008-206058 A | 9/2008 |
| JP | 2010-068263 A | 3/2010 |
| JP | 2010-136347 A | 6/2010 |
| WO | WO 2007139063 A1 * | 12/2007 |

OTHER PUBLICATIONS

International Search Report; PCT/JP2011/066274; Aug. 30, 2011.
An Office Action; "Notice of Reasons for Rejection," issued by the Japanese Patent Office on Apr. 30, 2014, which corresponds to Japanese Patent Application No. 2010-162330 and is related to U.S. Appl. No. 13/810,392; with English language statement of relevance.

* cited by examiner

200
RADIO BASE STATION AND COMMUNICATION CONTROL METHOD

TECHNICAL FIELD

The present invention relates to a radio base station that transmits and receives a radio signal to and from a radio terminal using a plurality of antennas, and a communication control method in the radio base station.

BACKGROUND ART

In 3GPP (Third Generation Partnership Project), according to a radio communication system corresponding to LTE (Long Term Evolution) having a standard being currently designed, a radio base station eNB performs assignment of a radio resource in radio communication between the radio base station eNB and a radio terminal UE (for example, refer to Non Patent Literature 1). Furthermore, in the radio communication system corresponding to the LTE, one of frequency division duplex (FDD) and time division duplex (TDD) is employed in the radio communication between the radio base station eNB and the radio terminal UE.

Moreover, in an LTE (TDD-LTE) radio communication system employing the TDD, there has been discussed a feature where the radio base station eNB performs control (adaptive array control) for adaptively directing a beam toward the radio terminal UE that is moving at the time of transmission of a downlink radio signal and for directing a null toward another radio terminal UE, in order to ensure communication quality between the radio base station eNB and the radio terminal UE.

In the adaptive array control, a sounding reference signal (SRS) is transmitted from the radio terminal UE to the radio base station eNB using a resource block that is an uplink radio resource. Meanwhile, the radio base station eNB calculates an antenna weight for an uplink radio signal on the basis of the SRS.

However, the SRS is distributed and arranged in the frequency direction and the time direction. Therefore, in the calculation of an autocorrelation matrix in the process of calculating an antenna weight, there is a case in which SRS serving as an interference signal from another radio terminal is not added to SRS from one radio terminal UE and a null direction is not determined.

CITATION LIST

Non Patent Literature

[Non Patent Literature 1] 3GPP TS 36.211 V8.7.0 "Physical Channels and Modulation", MAY 2009

SUMMARY OF INVENTION

A first feature of the present invention is summarized as a radio base station (radio base station eNB1) of an adaptive array scheme, which transmits and receives a radio signal to and from a radio terminal (radio terminal UE2) using a plurality of antennas (antennas 108A, 108B, 108C, 108D), comprising: a reception unit (FFT processing unit 124) that receives a first known signal (first SRS) that is transmitted from a first radio terminal (radio terminal UE2A) using a first radio resource, and receive a second known signal (second SRS) that is transmitted from a second radio (radio terminal UE2B) terminal using a second radio resource different from the first radio resource; and a calculation unit (AAA processing unit 126) that calculates an antenna weight used in radio communication with the first radio terminal, on the basis of the first known signal and the second known signal received in the reception unit.

According to the above feature, when calculating the antenna weight used in radio communication with the first radio terminal, the radio base station uses the first known signal transmitted from the first radio terminal using a first radio resource and the second known signal transmitted from a second radio terminal using a second radio resource. Consequently, the second known signal from the second radio terminal is added to the first known signal from the first radio terminal UE, so that it is possible to determine a null direction, thereby enabling appropriate adaptive array.

A second feature of the present invention is summarized as that the first known signal and the second known signal have a same frequency bandwidth and are alternately arranged in the frequency direction, and the calculation unit assumes that the first known signal and the second known signal have a same frequency band, and calculates an autocorrelation matrix corresponding to the first radio terminal.

A third feature of the present invention is summarized as that the first known signal and the second known signal are respectively arranged at different frequency band in the frequency direction in each time period, the radio base station comprising a storage unit that store the second known signal is provided, and wherein the calculation unit calculates an autocorrelation matrix corresponding to the first radio terminal, on the basis of the first known signal, and the second known signal having a frequency band equal to a frequency band of the first known signal among the second known signals stored in the storage unit.

A fourth feature of the present invention is summarized as a communication control method in a radio base station of an adaptive array scheme, which transmits and receives a radio signal to and from a radio terminal using a plurality of antennas, comprising the steps of: receiving a first known signal that is transmitted from a first radio terminal using a first radio resource, and receiving a second known signal that is transmitted from a second radio terminal using a second radio resource different from the first radio resource; and calculating an antenna weight used in radio communication with the first radio terminal, on the basis of the received first known signal and second known signal.

DESCRIPTION OF EMBODIMENTS

Next, an embodiment of the present invention will be described with reference to the drawings. Specifically, (1) Configuration of radio communication system, (2) Operation of radio communication system, (3) Operation and effect, and (4) Other embodiments will be described. It is to be noted that the same or similar reference numerals are applied to the same or similar parts through the drawings in the following embodiments.

(1) Configuration of Radio Communication System

First of all, a configuration of a radio communication system according to an embodiment of the present invention is explained in the order of (1.1) Entire schematic configuration of radio communication system and (1.2) Configuration of radio base station.

(1.1) Entire Schematic Configuration of Radio Communication System

Figure 1:
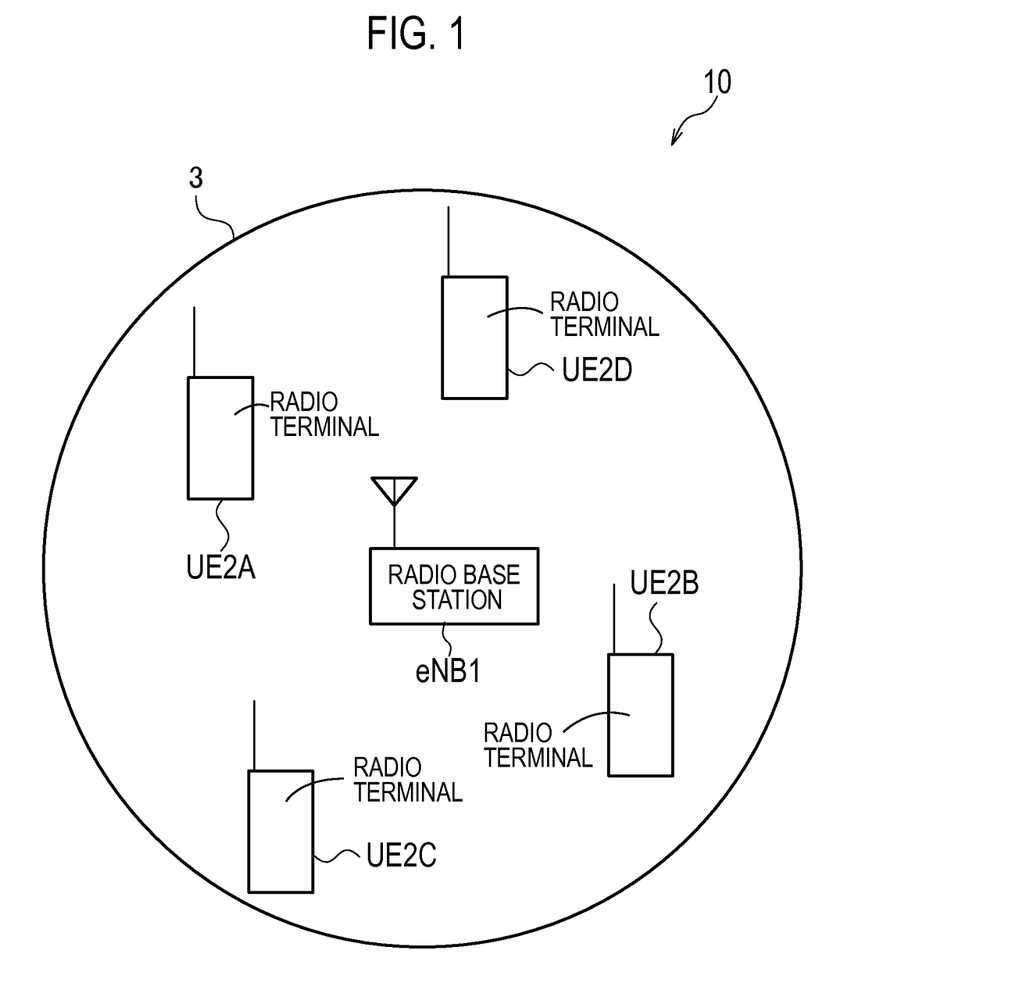
FIG. 1 is a diagram illustrating the entire schematic configuration of a radio communication system according to an embodiment of the present invention.

FIG. 1 is a diagram illustrating the entire schematic configuration of a radio communication system 10 according to the embodiment of the present invention.

The radio communication system 10 illustrated in FIG. 1 is a TDD-LTE radio communication system. The radio communication system 10 includes a radio base station eNB1, a radio terminal UE2A, a radio terminal UE2B, a radio terminal UE2C, and a radio terminal UE2D. In FIG. 1, the radio base station eNB1 constitutes E-UTRAN (Evolved-UMTS Terrestrial Radio Access Network) together with another radio base station eNB (not illustrated). The radio terminal UE2A to the radio terminal UE2D exist in a cell 3 that is a communication available area provided by the radio base station eNB1.

Time division duplex is employed in radio communication between the radio base station eNB1 and the radio terminal UE2A to the radio terminal UE2D, OFDMA (Orthogonal Frequency Division Multiplexing Access) is employed in downlink radio communication, and SC-FDMA (Single Carrier Frequency Division Multiple Access) is employed in uplink radio communication. Furthermore, downlink indicates a direction from the radio base station eNB1 to the radio terminal UE2A to the radio terminal UE2D. Uplink indicates a direction from the radio terminal UE2A to the radio terminal UE2D to the radio base station eNB1.

The radio base station eNB1 assigns a resource block (RB) as a radio resource to the radio terminal UE2A to the radio terminal UE2D in the cell 3.

The resource block includes a downlink resource block (downlink RB) to be used in the downlink radio communication and an uplink resource block (uplink RB) to be used in the uplink radio communication. A plurality of downlink resource blocks are arranged in the frequency direction. Similarly, a plurality of uplink resource blocks are arranged in the frequency direction.

The downlink resource block includes a control information channel (PDCCH: Physical Downlink Control CHannel) for transmitting downlink control information, and a shared data channel (PDSCH: Physical Downlink Shared CHannel) for transmitting downlink user data in the time direction.

Meanwhile, the uplink resource block includes a control information channel (PUCCH: Physical Uplink Control CHannel) for transmitting uplink control information at both ends of an entire frequency band available in the uplink radio communication, and a shared data channel (PUSCH: Physical Uplink Shared CHannel) for transmitting uplink user data at the center part thereof.

At the time of assignment of the resource block, it is possible to employ frequency hopping in which a frequency to be assigned is changed according to a predetermined frequency hopping pattern.

(1.2) Configuration of Radio Base Station

Figure 2:
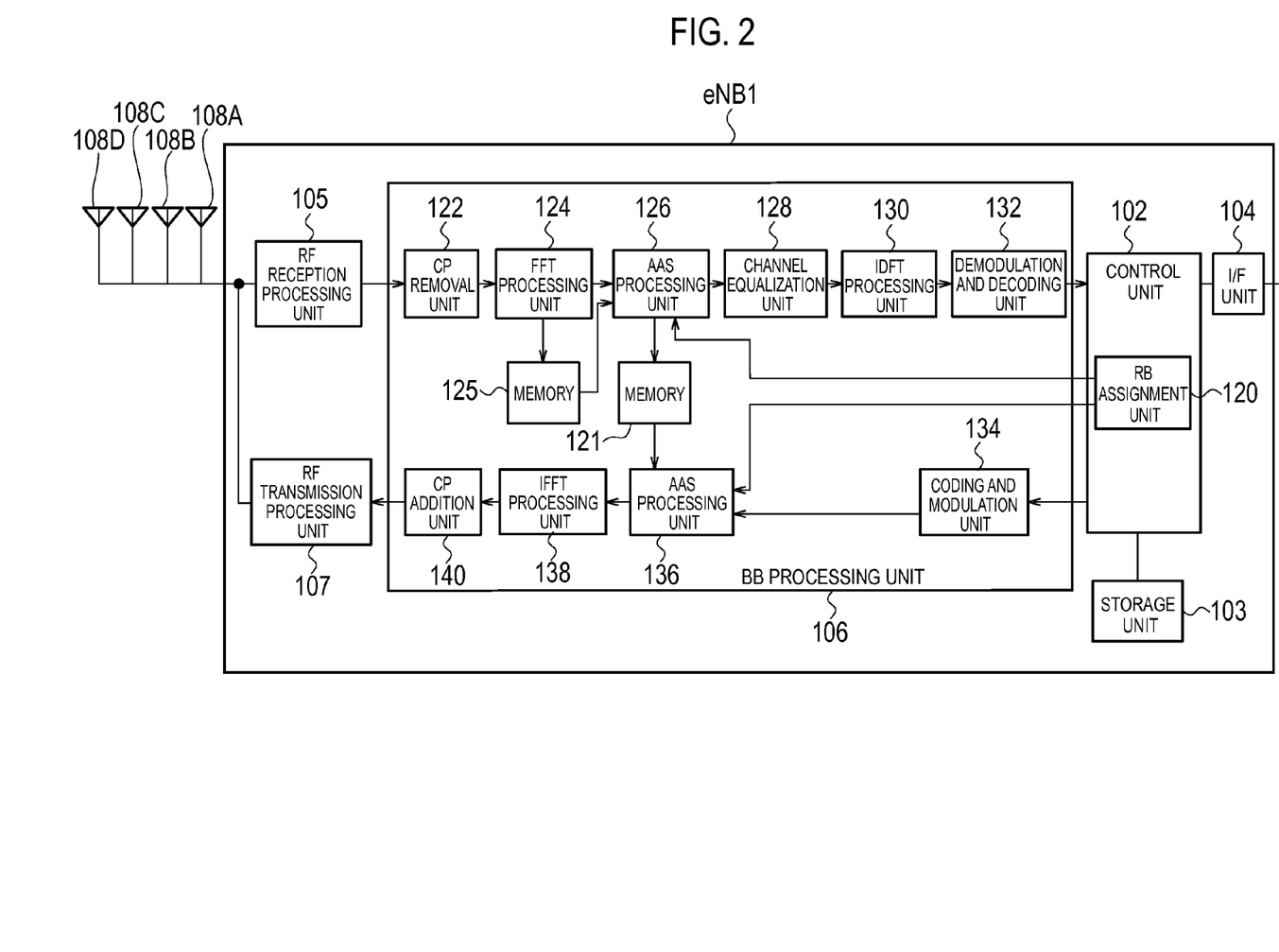
FIG. 2 is a configuration diagram of a radio base station according to the embodiment of the present invention.

FIG. 2 is a configuration diagram of the radio base station eNB1. As illustrated in FIG. 2, the radio base station eNB1 is a radio base station of an adaptive array scheme, and includes a control unit 102, a storage unit 103, an I/F unit 104, a radio frequency (RF) reception processing unit 105, a base band (BB) processing unit 106, a RF transmission processing unit 107, an antenna 108A, an antenna 108B, an antenna 108C, and an antenna 108D.

The control unit 102 is configured, for example, by a CPU, and controls various functions of the radio base station eNB1. The control unit 102 includes a RB assignment unit 120. The storage unit 103 is configured, for example, by a memory, and stores various types of information used for the control and the like of the radio base station eNB1. The I/F unit 104 is able to communicate with another radio base station eNB through an X1 interface. Furthermore, the I/F unit 104 is able to communicate with EPC (Evolved Packet Core), specifically, MME (Mobility Management Entity)/S-GW (Serving Gateway), through an S1 interface.

The RF reception processing unit 105 receives an uplink radio signal of a radio frequency band from the radio terminal UE2A to the radio terminal UE2D through the antenna 108A to the antenna 108D. For the transmission of the uplink radio signal from the radio terminal UE2A to the radio terminal UE2D, uplink resource blocks assigned to the radio terminal UE2A to the radio terminal UE2D are used.

The RF reception processing unit 105 has LNA (Low Noise Amplifier) (not illustrated) and a mixer (not illustrated) therein. The RF reception processing unit 105 amplifies the received uplink radio signal of a radio frequency band, and converts (down-converts) the amplified signal to a base band signal. Moreover, the RF reception processing unit 105 outputs the base band signal to the BB processing unit 106.

The BB processing unit 106 includes memories 121 and 125, a CP (Cyclic Prefix) removal unit 122, a FFT (Fast Fourier Transform) processing unit 124, an AAS (Adaptive Array System) processing unit 126, a channel equalization unit 128, an IDFT (Inverse Discrete Fourier Transform) processing unit 130, a demodulation and decoding unit 132, a coding and modulation unit 134, an AAS processing unit 136, an IFFT (Inverse Fast Fourier Transform) processing unit 138, and a CP addition unit 140.

The RB assignment unit 120 of the control unit 102 acquires an assignment value (an RB assignment value) of a resource block, which is acquired by a process of a media access control (MAC) layer, in the control unit 102. The RB assignment value includes a resource block number that is identification information of a downlink resource block and an uplink resource block to be assigned to the radio terminal UE2. The RB assignment unit 120 outputs the RB assignment value to the AAS processing unit 126 and the AAS processing unit 136.

The CP removal unit 122 removes CP (Cyclic Prefix) from an input base band signal. The CP indicates duplication of an end part of an OFDM symbol, and is included in a period of a guard interval provided in order to suppress inter-symbol interference occurring by a multi-path.

The FFT processing unit 124 performs fast Fourier transform on the base band signal having no CP, thereby acquiring a frequency domain signal. Moreover, the FFT processing unit 124 associates identification information of a radio terminal UE, which serves as a transmission source of a sounding reference signal (SRS) in the frequency domain signal, with frequency band information, reception level information, and arrival direction information of the SRS, and stores the associated information in the memory 125.

Figure 3:
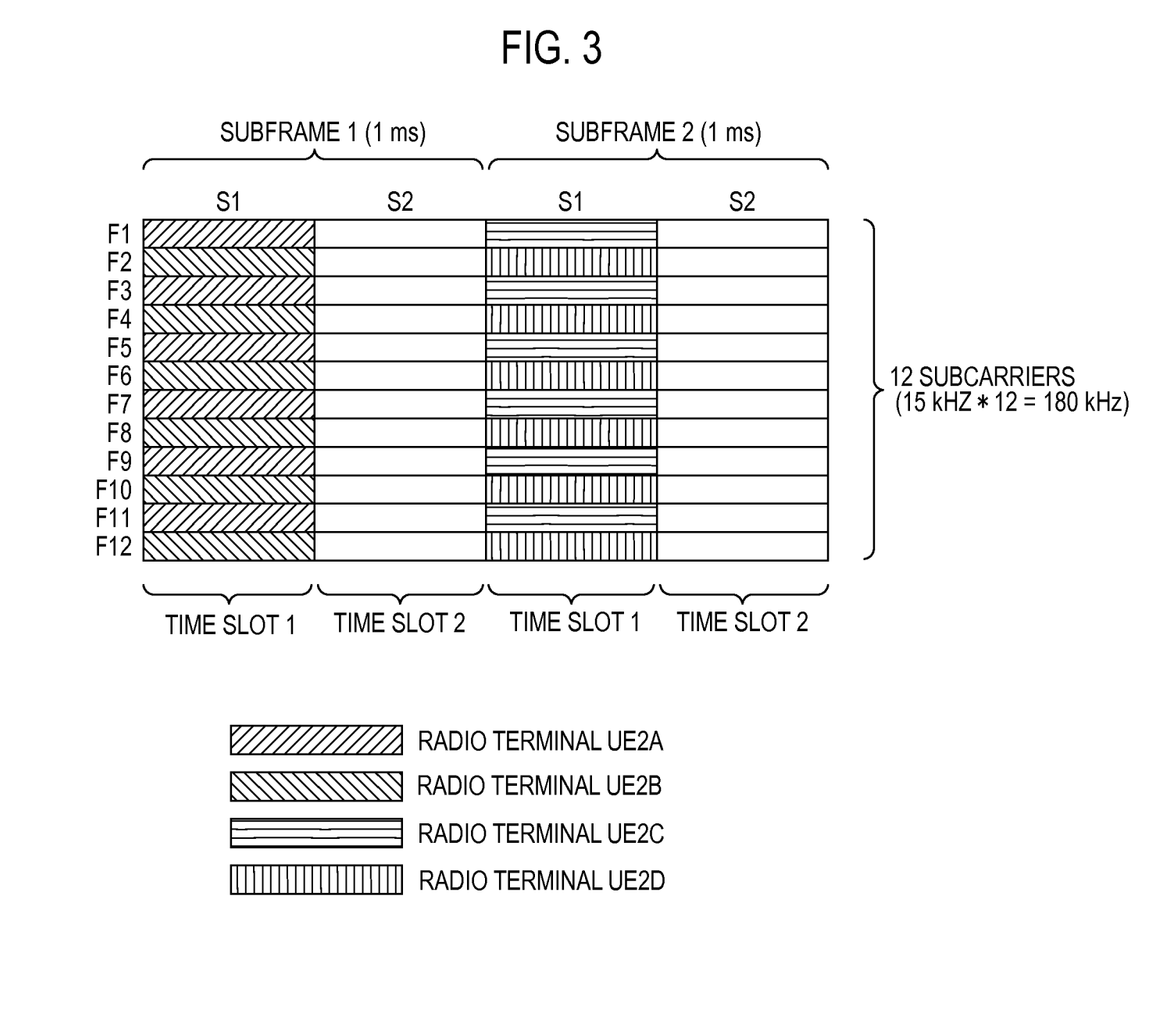
FIG. 3 is a diagram illustrating a format of an uplink resource block according to the embodiment of the present invention.

FIG. 3 is a diagram illustrating a format of the uplink resource block. As illustrated in FIG. 3, the uplink resource block includes a subframe having a time length of 1 [ms] in the time direction. The subframe includes a first half time slot (a time slot 1) and a latter half time slot (a time slot 2).

Furthermore, as illustrated in FIG. 3, the uplink resource block has a frequency bandwidth of 180 [kHz] in the frequency direction. Furthermore, the uplink resource block includes 12 subcarriers F1 to F12, wherein each subcarrier has a frequency bandwidth of 15 [kHz].

In a subframe 1, among the 12 subcarriers, odd-numbered subcarriers include SRS from the radio terminal UE2A and even-numbered subcarriers include SRS from the radio terminal UE2B. Furthermore, in a subframe 2 subsequent to the subframe 1, odd-numbered subcarriers include SRS from the radio terminal UE2C and even-numbered subcarriers include SRS from the radio terminal UE2D.

For each of the radio terminal UE2A to the radio terminal UE2D, the AAS processing unit 126 calculates antenna weights (reception weights), at which signal-to-interference noise ratio (SINR) at the time of reception of the uplink radio signal is maximum, with respect to the antenna 108A to the antenna 108D, on the basis of the corresponding SRS.

Specifically, when the SRS is included in the uplink resource block as illustrated in FIG. 3, a reception weight corresponding to the radio terminal UE2A is calculated as follows. That is, the AAS processing unit 126 designates a frequency band of an uplink resource block assigned to the radio terminal UE2A, on the basis of a RB assignment value. Next, the AAS processing unit 126 assumes that in the designated frequency band of an uplink resource block, a frequency band of SRS (SRS from the radio terminal UE2A) included in the odd-numbered subcarrier is equal to that of SRS (SRS from the radio terminal UE2B) included in the even-numbered subcarrier, which has a phase difference corresponding to one subcarrier (15 [kHz]) with respect to the odd-numbered subcarrier, and reads reception level information and arrival direction information of the SRS included in the odd-numbered subcarrier and reception level information and arrival direction information of the SRS included in the even-numbered subcarrier, from the memory 125. Moreover, the AAS processing unit 126 calculates an autocorrelation matrix Rzz, according to the following Equation 1, on the basis of the reception level information and the arrival direction information of the SRS included in the odd-numbered subcarrier and the reception level information and arrival direction information of the SRS included in the even-numbered subcarrier.

[Equation 1]

$$Rzz(k, k) = \sum_{f}^{シンボル数} (z(k, f)^H * z(k, f)) \quad \text{(Equation 1)}$$

Moreover, similarly to the conventional art, the AAS processing unit 126 calculates an array response vector Rzs according to the following Equation 2, and calculates a reception weight WRx, which corresponds to the radio terminal UE2A, according to the following Equation 3, on the basis of the autocorrelation matrix Rzz and the array response vector Rzs.

[Equation 2]

$$Rzs(k) = \sum_{f}^{the\ number\ of\ symbols} (z(k, f) * s(k, f)^H) \quad \text{(Equation 2)}$$

[Equation 3]

$$W_{RX}(k) = Rzz(k, k)^{-1} * Rzs(k) \quad \text{(Equation 3)}$$

In Equation 1 to Equation 3 above, z denotes received SRS, s denotes ideal SRS, k denotes an antenna element number, f denotes a number of a subcarrier including SRS, and H denotes a complex conjugate transposition. In addition, reception weights corresponding to the radio terminal UE2B to the radio terminal UE2D are also calculated in the same manner.

Furthermore, when frequency hopping is employed in the assignment of the uplink resource block, the AAS processing unit 126 designates a frequency band of the uplink resource block assigned to the radio terminal UE2A, on the basis of a RB assignment value. Next, the AAS processing unit 126 reads the latest frequency band information, reception level information, and arrival direction information of the SRS from the radio terminal UE2A from the memory 125, in the designated frequency band of an uplink resource block. Moreover, the AAS processing unit 126 reads, of from the reception level information and the arrival direction information, which are stored in the memory 125, of SRS from the radio terminal UE2B to the radio terminal UE2D, information in which the corresponding frequency band information is the same frequency band information of the SRS from the radio terminal UE2A.

Next, the AAS processing unit 126 calculates an autocorrelation matrix Rzz by Equation 1 above on the basis of the read reception level information and arrival direction information of the SRS from the radio terminal UE2A and the read reception level information and arrival direction information of the SRS from the radio terminal UE2B to the radio terminal UE2D.

Moreover, similarly to the conventional art, the AAS processing unit 126 calculates an array response vector Rzs by Equation 2 above, and calculates a reception weight WRX, which corresponds to the radio terminal UE2A, according to Equation 3 above, on the basis of the autocorrelation matrix Rzz and the array response vector Rzs.

The channel equalization unit 128 performs a channel equalization process on the frequency domain signal. The IDFT processing unit 130 performs inverse discrete Fourier transform on the signal on which the channel equalization process was performed. The demodulation and decoding unit 132 performs demodulation and decoding processes on the signal on which the inverse discrete Fourier transform was performed. In this way, data transmitted by the radio terminal UE2 is obtained. The data is output to the control unit 102.

When the data is input from the control unit 102, the coding and modulation unit 134 performs coding and modulation on the data, thereby obtaining a frequency domain signal.

The AAS processing unit 136 sets an antenna weight (a transmission weight) at the time of transmission of a downlink radio signal to the radio terminal UE2 with respect to each of the antenna 108A to the antenna 108D.

The IFFT processing unit 138 performs inverse fast Fourier transform on the frequency domain signal, thereby obtaining a baseband signal. The CP addition unit 140 adds CP to the input base band signal. The CP addition unit 140 outputs the base band signal having the CP added thereto to the RF transmission processing unit 107.

The RF transmission processing unit 107 has a mixer (not illustrated) and a power amplifier (not illustrated) therein. The RF transmission processing unit 107 converts (up-converts) the base band signal having the CP added thereto to a downlink radio signal of a radio frequency band. Moreover, the RF transmission processing unit 107 amplifies the downlink radio signal of a radio frequency band, and transmits the amplified downlink radio signal of a radio frequency band through the antenna 108A to the antenna 108D in which the transmission weights was set.

(2) Operation of Radio Communication System

Figure 4:
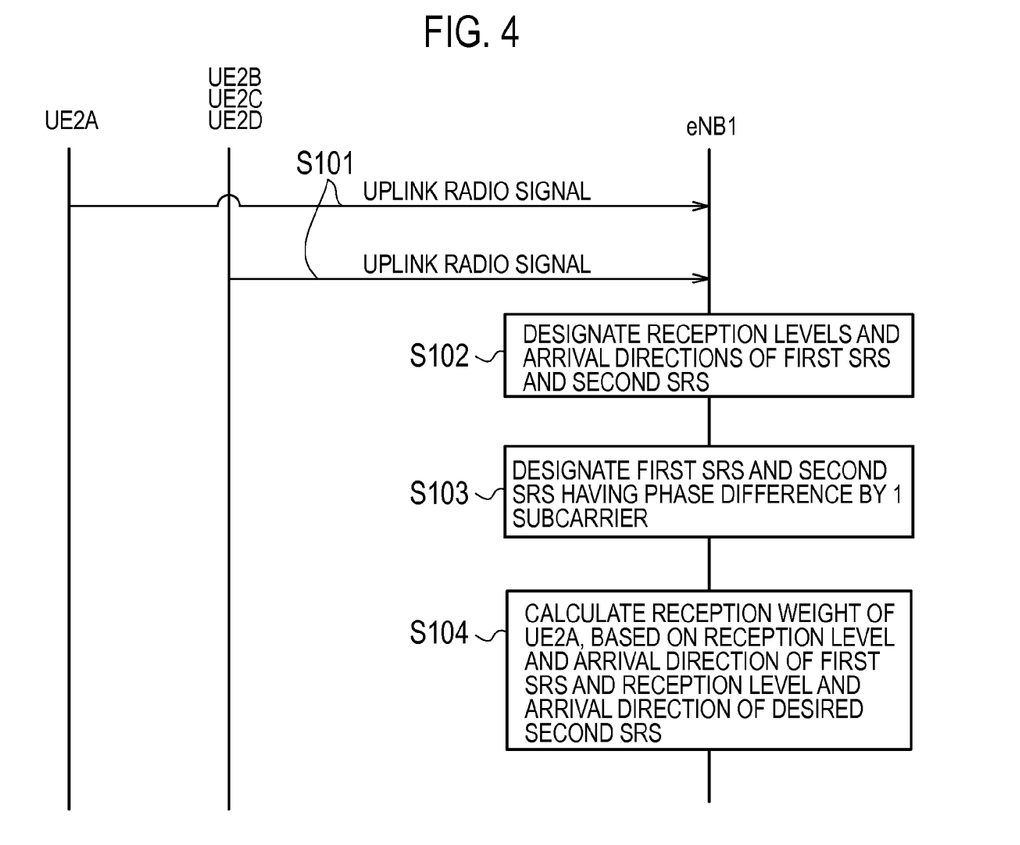
FIG. 4 is a sequence diagram illustrating a first operation of a radio communication system according to the embodiment of the present invention.

FIG. 4 is a sequence diagram illustrating a first operation of the radio communication system 10. Hereinafter, a description will be provided for a case in which the reception weight of the radio terminal UE2A is calculated.

In step S101, the radio terminal UE2A to the radio terminal UE2D transmit an uplink radio signal of a radio frequency band. The radio base station eNB1 receives the uplink radio signal of a radio frequency band from the radio terminal UE2A to the radio terminal UE2D.

In step S102, the radio base station eNB1 designates a reception level and an arrival direction of SRS (first SRS) from the radio terminal UE2A, and designates reception levels and arrival directions of SRS (second SRS) from the radio terminal UE2B to the radio terminal UE2D.

In step S103, the radio base station eNB1 designates second SRS having a phase difference corresponding to one subcarrier with respect to the first SRS.

In step S104, the radio base station eNB1 calculates the reception weight of the radio terminal UE2A on the basis of the reception level and the arrival direction of the first SRS and the reception levels and the arrival directions of the second SRS designated in step S103.

Figure 5:
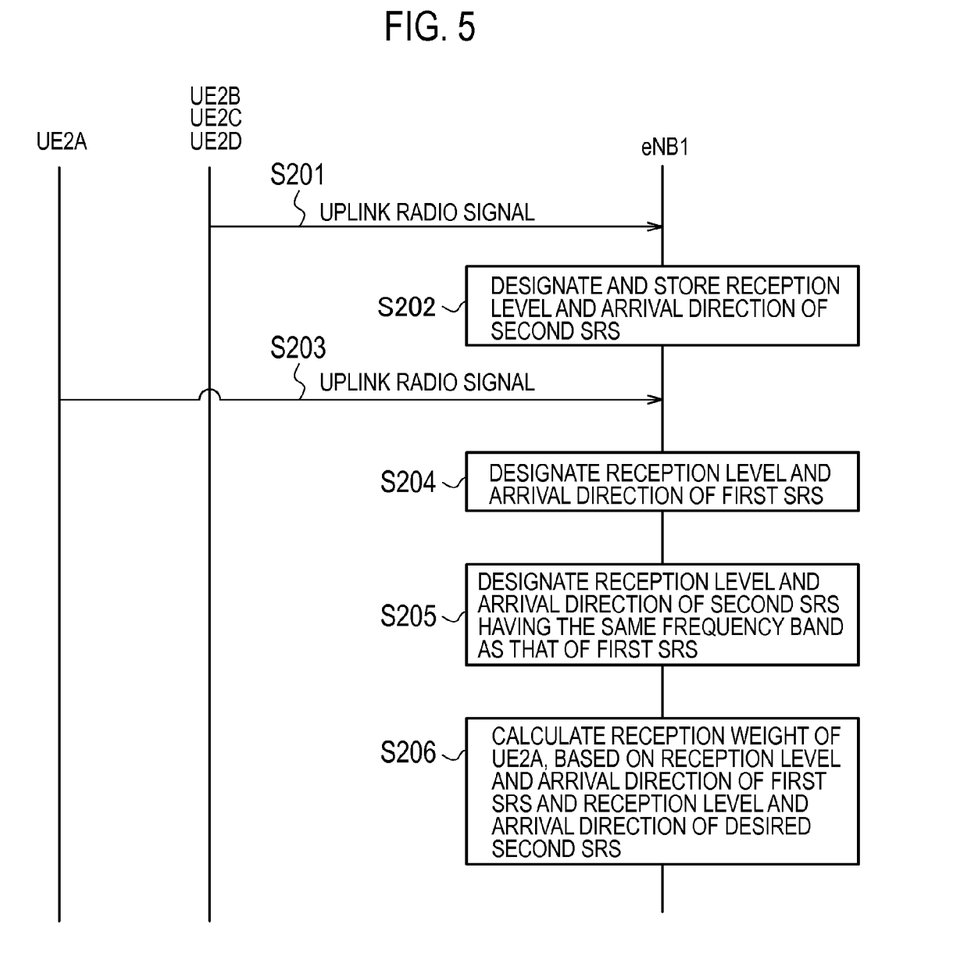
FIG. 5 is a sequence diagram illustrating a second operation of the radio communication system according to the embodiment of the present invention.

FIG. 5 is a sequence diagram illustrating a second operation of the radio communication system 10. Hereinafter, similarly to FIG. 4, a description will be provided for a case in which the reception weight of the radio terminal UE2A is calculated.

In step S201, the radio terminal UE2B to the radio terminal UE2D transmit an uplink radio signal of a radio frequency band. The radio base station eNB1 receives the uplink radio signal of a radio frequency band from the radio terminal UE2B to the radio terminal UE2D.

In step S202, the radio base station eNB1 designates and stores reception levels and arrival directions of SRS (second SRS) from the radio terminal UE2B to the radio terminal UE2D.

In step S203, the radio terminal UE2A, of which the reception weight is calculated, transmits an uplink radio signal of a radio frequency band. The radio base station eNB1 receives the uplink radio signal of a radio frequency band from the radio terminal UE2A.

In step S204, the radio base station eNB1 designates a reception level and an arrival direction of SRS (first SRS) from the radio terminal UE2A.

In step S205, the radio base station eNB1 designates a reception level and an arrival direction of second SRS having a frequency band that is equal to that of the first SRS.

In step S206, the radio base station eNB1 calculates the reception weight of the radio terminal UE2A on the basis of the reception level and the arrival direction of the first SRS and the reception level and the arrival direction of the second SRS designated in step S205.

(3) Operation and Effect

As described above, according to the embodiment, when calculating a reception weight that is used in radio communication with the radio terminal UE2A, the radio base station eNB1 uses SRS from the radio terminal UE2A and uses at least one of SRS from the radio terminal UE2B to the radio terminal UE2D. Consequently, one of the SRS from the radio terminal UE2B to the radio terminal UE2D is added to the SRS from the radio terminal UE2A, so that it is possible to determine a null direction, thereby enabling appropriate adaptive array.

(4) Other Embodiments

As described above, the present invention has been described with the embodiments. However, it should not be understood that those descriptions and drawings constituting a part of the present disclosure limit the present invention. From this disclosure, a variety of alternate embodiments, examples, and applicable techniques will become apparent to one skilled in the art.

In the aforementioned embodiment, the radio base station eNB1 calculated the reception weight on the basis of the SRS. However, the reception weight may be set on the basis of another signal included in the uplink radio signal.

In the aforementioned embodiments, the TDD-LTE radio communication system was described. However, the present invention can be applied in the same manner to all types of radio communication systems in which asymmetric radio communication in which a frequency band of an uplink radio signal to be assigned to a radio terminal is different from a frequency band of a downlink radio signal is employed.

Thus, it must be understood that the present invention includes various embodiments that are not described herein. Therefore, the present invention is limited only by the specific features of the invention in the scope of the claims reasonably evident from the disclosure above.

In addition, the entire content of Japanese Patent Application No. 2010-162330 (filed on Jul. 16, 2010) is incorporated in the present specification by reference.

INDUSTRIAL APPLICABILITY

According to the present invention, appropriate adaptive array control is possible.

The invention claimed is:

1. A radio base station of an adaptive array scheme, which transmits and receives a radio signal to and from a radio terminal using a plurality of antennas, comprising:
   a reception unit configured to receive a plurality of known signals including a first known signal that is transmitted from a first radio terminal using a first radio resource, and a second known signal that is transmitted from a second radio terminal using a second radio resource different from the first radio resource; and
   a calculation unit configured to select the second known signal from the plurality of known signals on the basis of a frequency band of the first radio resource and calculate an antenna weight used in radio communication with the first radio terminal, on the basis of the first known signal received in the reception unit and the second known signal received in the reception unit and selected in the calculation unit.

2. The radio base station according to claim 1, wherein the calculation unit is configured to select the second known signal from the plurality of known signals in a case where the first known signal and the second known signal have a same frequency bandwidth and are alternately arranged in the frequency direction.

3. The radio base station according to claim 1, wherein the calculation unit is configured to select the second known signal having a frequency band equal to a frequency band of the first known signal from the plurality of known signals in a case where the first known signal and the second known signal are respectively arranged at different frequency band in the frequency direction in each time period.

4. A communication control method in a radio base station of an adaptive array scheme, which transmits and receives a radio signal to and from a radio terminal using a plurality of antennas, comprising the steps of:
receiving a plurality of known signals including a first known signal that is transmitted from a first radio terminal using a first radio resource and a second known signal that is transmitted from a second radio terminal using a second radio resource different from the first radio resource;
selecting the second known signal from the plurality of known signals on the basis of a frequency band of the first radio resource; and
calculating an antenna weight used in radio communication with the first radio terminal, on the basis of the received first known signal and the received and selected second known signal.

* * * * *